Jan. 7, 1936.  L. E. T. BRANCH  2,026,960
MOTION PICTURE CAMERA AND PROJECTOR
Filed July 18, 1934
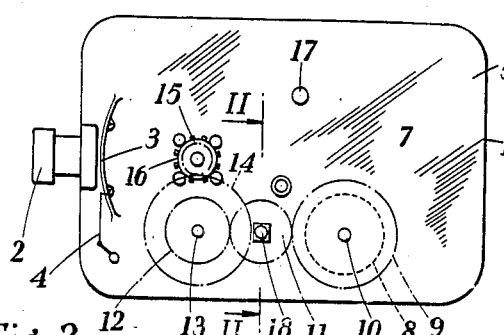
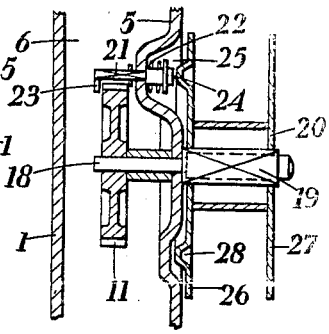
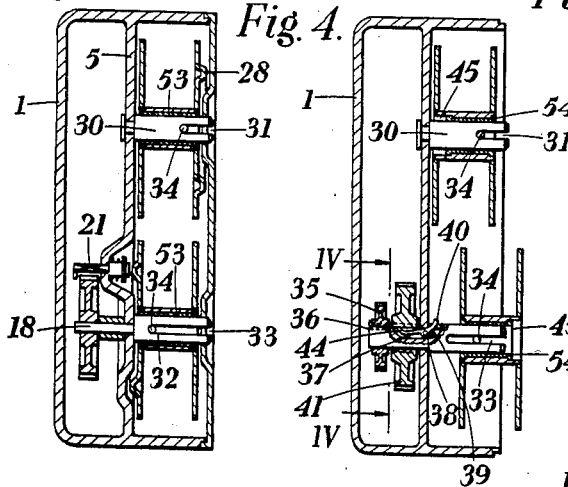
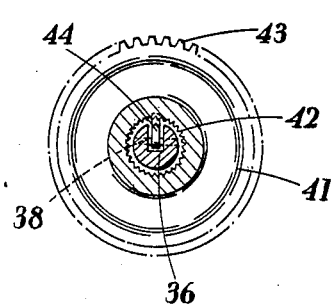
INVENTOR
Leslie Ernest Thomas Branch
BY
Donald H. Stewart, Newton M. Perrins
ATTORNEYS Patented Jan. 7, 1936

2,026,960

UNITED STATES PATENT OFFICE 2,026,960

MOTION PICTURE CAMERA AND PROJECTOR

Leslie Ernest Thomas Branch, Ilford, England, assignor to Eastman Kodak Company, Rochester, N. Y., a corporation of New York Application July 18, 1934, Serial No. 735,760
In Germany July 19, 1933

18 Claims. (Cl. 242—55)

This invention relates to motion picture cameras and projectors in which the film strip is fed by feed mechanism, such for example as a film sprocket, through an exposure gate or the like to a take-up spool or core which is driven so as to wind the exposed or projected film thereon.

In motion picture cameras and projectors, and particularly those employing film strip upon which two rows of images are to be or have been recorded side by side with the images of one row inverted relatively to those in the other row, difficulties are liable to arise due to a spool or core being incorrectly placed in position, that is to say with the axis of the spool or core reversed end for end relatively to its correct position on the take-up spindle. If the spool or core is thus incorrectly placed in position and the feed mechanism of the camera or projector set in motion, considerable inconvenience will result in the case of projection whilst in the case of exposure in a camera the whole film will be spoilt. The present invention has for its object to overcome this difficulty.

To this end a motion picture camera or projector according to the present invention comprises film feed mechanism including a take-up spindle or support, transmission mechanism through which the drive can be transmitted to the film feed mechanism, and a core, either alone or contained in a magazine, adapted to be placed on and rotated by the take-up spindle, the core itself or the magazine containing it being constructed to cooperate with the transmission mechanism so that the drive can be transmitted to the feed mechanism only when the take-up core is correctly placed in position on the take-up spindle or support. In this way the camera or projector is inoperative until the take-up core has been correctly arranged on the take-up support.

It will be understood that the "core" may either be in the form of a simple sleeve adapted to fit on the take-up spindle or support or may be the hub of a spool furnished with flanges.

The effective operation of the transmission mechanism may be controlled by means of a device arranged to cooperate with the take-up core or with the magazine containing it, so that when the core is placed on the take-up spindle in one position relatively thereto the drive can be transmitted to the feed mechanism but when the take-up core is incorrectly placed on the spindle the transmission mechanism is inoperative.

The invention may be carried into practice in various ways but three constructions according thereto are illustrated diagrammatically and by way of example as applied to a motion picture camera in the accompanying drawing, in which Figure 1 illustrates the camera in side elevation with the door removed, Figure 2 is a section on the line II—II of Figure 1 but on an enlarged scale, Figure 3 illustrates a modified construction on a section similar to that of Figure 2 but taken throughout the width of the camera and showing the door closed, Figure 4 is a view similar to that of Figure 3 of another construction, Figure 5 illustrates the construction shown in Figure 4 but with the camera closed, Figure 6 is a section on the line VI—VI of Figure 4 but on an enlarged scale, and Figure 7 illustrates a construction employing a film magazine.

In the construction illustrated in Figures 1 and 2 the camera comprises a casing 1 carrying an objective 2 with a cooperating gate 3 and pulldown mechanism 4. The interior of the casing 1 is divided by a partition 5 into a mechanism chamber 6 and spool chamber 7. Arranged in the mechanism chamber is a motor 8 which drives a gear wheel 9 rotatable about a spindle 10. The gear wheel 9 meshes with a gear wheel 11 which in turn transmits the drive to a gear wheel 12 keyed to a shaft 13 to which is secured a gear wheel 14 meshing with a toothed rim 15 on a film sprocket 16. The partition 5 carries a film supply spindle 17 adapted to receive a supply spool (not shown) carrying the film which is fed in the usual way by the sprocket 16 to the gate 3. The gear wheel 11 is secured to a take-up spindle 18 journalled in the partition 5 as shown in Figure 2, that end of the take-up spindle projecting into the spool chamber 7 carrying a squared part 19 adapted to engage square apertures concentric with the hub of the take-up spool 20.

A locking device 21 of square cross-section is longitudinally movable through a square aperture in the partition 5 and is normally held by a spring 22 so that a claw 23 engages the teeth on the gear wheel 11 the head 24 of the locking device projecting out of a recess 25 in the partition 5 into the spool chamber 7. The spool 20 is furnished with two flanges 26 and 27 the flange 26 having an external annular bead 28 which, when the spool is correctly placed on the take-up spindle 18 bears against the head 24 of the locking device 21 as shown in Figure 2. The claw 23 is thus moved out of engagement with the wheel 11 and the motor 8 can transmit the drive through the wheel 11 not only to the take-up spindle 18 but also to the sprocket 16. If the spool 20 is placed on the spindle in the reverse position relatively thereto, the flange 27 whose outer surface is plane, will not engage the head 24 of the locking device 21 so that this will remain locked by the claw 23 and the drive cannot be transmitted from the motor 8 to the feed mechanism.

The invention, while applicable to all motion picture cameras and projectors employing detachable and interchangeable spools or cores or magazines carrying such cores, is more particularly advantageous when applied to cameras or projectors employing film upon which two rows of images are to be or have been recorded with the images in one row inverted relatively to those in the other row. With apparatus of this type, after the film has passed from the supply spool through the gate of the camera or projector to the take-up spool thereby exposing or projecting one half of the width of the film, the spools must be removed from the spindles and the take-up spool turned through 180° about a diametral axis before it is placed on the supply spindle whereupon the second half or row of picture areas will be recorded or projected.

One construction of motion picture camera of this type and embodying the invention is illustrated in Figure 3 from which it will be seen that one of the flanges of each spool is furnished with the annular rib 28 as shown in Figure 2 so that unless one of the spools is placed on the take-up spindle 18 with the annular rib 28 in engagement with the locking device 21, the camera is inoperative since the transmission mechanism is locked. A cylindrical supply spindle 30 journalled in the partition 5 is furnished with a longitudinal slot 31 which is open at the free end of the spindle whilst the take-up spindle 18 is provided at its outer end with a cylindrical part 32 similarly furnished with a slot 33, the slot 31 being somewhat shorter than the slot 33. Each of the spools carries an internally projecting pin or stud 34 which is secured to the spool near that end of its hub which lies more adjacent to the flange furnished with the annular rib 28.

Assuming now that it is desired to load the camera the spool bearing the film which is to be exposed or projected is placed on the supply spindle 30 and, as will be clearly seen, since the pin 34 lies adjacent to the flange bearing the rib 28 and the slot 31 only extends a short distance along the length of the supply spindle 30, the supply spool cannot be placed on this spindle with the flange bearing the rib 28 inwards since the pin 34 would then prevent the spool from being fully driven on to the spindle 30 and the door of the camera could not be closed. The film is now threaded over the sprocket and through the gate of the camera whereupon its free end is attached to the hub of the take-up spool which is then placed in position on the take-up core 18. The take-up core, for the reasons above indicated, can only be placed on the spindle 18 in the position relatively thereto shown in Figure 3 if the camera is to operate.

After having exposed one half of the width of the film this will have been wholly wound on the take-up core. It is now desired to expose the other half of the width of the film and it is therefore necessary to remove both spools from the spindles 30 and 32 and place the spool bearing the film on the supply spindle 30 at the same time placing the empty spool on the take-up spindle 18. The pin 34 on the spool bearing the film will prevent this from being placed on the supply spindle 30 unless the take-up spool, after removal from the take-up spindle 18, is turned about a diametral axis through 180°. Furthermore, the empty spool must be placed on the take-up spindle 18 in the correct position relatively thereto or the camera will be inoperative.

In the alternative construction illustrated in Figure 4 the drive is positively transmitted from the motor to a gear wheel 35 keyed to a take-up spindle 36, the outer end of which is constructed in a manner similar to that described with reference to the spindle 32 in Figure 3. The spindle 36 is furnished with a recess 37 within which is arranged a pawl pivoted at 38, a leaf spring 39 acting on the end 40 of the pawl so as to tend to cause this end to project through an aperture in the surface of the spindle. A gear wheel 41 (Figure 6) is furnished with internal teeth 42 and external teeth 43 from which the drive is transmitted to the feed sprocket, the spring 39 tending to hold the pawl in a position in which the end 44 lies within the recess 37 and thus clear of the internal teeth 42 of the gear wheel 41 as shown in Figures 4 and 6. Normally therefore the motor can transmit the drive through the gear wheel 35 to the take-up spindle but since the gear wheel 41 is free to rotate on the spindle 35, the feed sprocket is inoperative and the film will not therefore be fed through the camera.

The hub of each spool has formed at one end an internal annular recess 45 the opposite end of the hub being of normal construction so that when one of the spools is placed on the take-up spindle with the recess 45 inwards, the end 40 of the pivoted pawl is not engaged by the hub of the spool and the feed mechanism thus remains inoperative. If, however, the spool is placed in the relatively reversed position on the take-up spindle the hub will engage the projecting end 40 of the pivoted pawl and thus cause the end 44 to move out of the recess 37 into engagement with the internal teeth 42 of the gear wheel 41. The drive can now be transmitted from the motor not only to the take-up spindle 36 but also to the feed mechanism including the sprocket. The parts are now in the position shown in Figure 5 from which it will be seen that the supply and take-up spindles are furnished with slots adapted to cooperate with pins or projections carried by the spools as described with reference to Figure 3 so that a spool, when removed from the take-up spindle 36, can only be fully placed on the supply spindle 30 by rotating the take-up core through 180° about a diametral axis. The cover 46 can then be placed in position and the camera operated.

The invention is also applicable to constructions in which the film is wound from a supply core on to a take-up core both arranged within a detachable and reversible magazine. One construction of this type is illustrated in Figure 7 in which a magazine 48 carries two cores 49 and 50, each of which is rotatable within the magazine on internally projecting annular bosses 51. Each side wall of the magazine is furnished with a rib 52, these ribs being so arranged that the magazine can only be placed in two positions on the supply and take-up spindles at which locking member 21 is released and the camera feed mechanism thus rendered operative. Thus the ribs 52 are so arranged that after the film has passed in one direction through the gate and wholly wound on the core 50 the magazine, after removal, has to be inverted and reversed and the core 49 correctly engaged with the take-up spindle before the feed mechanism will be rendered operative.

It will be understood that since in constructions in which the film is intermittently fed through the gate of a motion picture camera or projector it is necessary to allow for variation in the speed at which the take-up core is driven so as to compensate for the increase in the effective diameter of this core due to the film being wound thereon, a friction drive may be provided between the transmission mechanism and the take-up core.

To this end, in the construction illustrated in Figure 2 the squared portion 19 of the take-up spindle is constituted by a sleeve of square external cross-section and having a cylindrical bore in frictional engagement with the spindle 18. Thus, though rotation of the gear wheel 11 will tend to rotate the spool 20, excessive tension of the film attached to the spool will result in the portion 19 slipping on and rotating relatively to the spindle 18. Similarly, in the construction illustrated in Figure 3, each pin 34 is rigidly secured to a sleeve 53 which frictionally engages the hub of the associated spool. In the construction illustrated in Figures 4 and 5 each pin 34 is rigidly connected to a friction sleeve 54 which engages the spool hub but is shortened at one end to allow for the recess 45. Similar provision is made when a magazine is employed as shown in Figure 7 wherein each spindle is of square external cross-section and engages a square bore in a friction sleeve 55 upon which the core 49 or 50 can slip when the film tension is excessive.

It will be understood that the constructions above described may be modified to suit requirements. Thus, for example, instead of providing external ribs on the magazine for cooperation with a locking device, the cores carried by the magazine may be recessed as described with reference to the spools in Figures 4 and 5 and these cores arranged to cooperate with a clutch member controlling the transmission of the drive through the transmission mechanism.

What I claim as my invention and desire to secure by Letters Patent is:—

1. In a motion picture camera or projector, in combination, film feed mechanism, a take-up support, means for driving the feed mechanism and take-up support, transmission mechanism through which the drive is transmitted to the feed mechanism, a take-up roll which can be placed on and rotated by said take-up support, and means associated with the roll whereby when this is placed on the take-up support in one position relatively thereto the transmission mechanism is operative but when the roll is placed on the support in the reversed position relatively thereto the transmission mechanism is inoperative and the drive cannot be transmitted to the feed mechanism.

2. In a motion picture camera or projector, in combination, film feed mechanism, a take-up support, means for driving the feed mechanism and take-up support, transmission mechanism through which the drive is transmitted to the feed mechanism, a device controlling the effective operation of the transmission mechanism, a take-up roll which can be placed on and rotated by said support, and means associated with the take-up roll and arranged to cooperate with said control device whereby when the roll is placed on the take-up support in one position relatively thereto the control device renders the transmission mechanism operative but when the roll is placed on the take-up support in the reversed position relatively thereto the control device renders the transmission mechanism inoperative and the drive cannot be transmitted to the feed mechanism.

3. In a motion picture camera or projector, in combination, film feed mechanism, a take-up support, means for driving the feed mechanism and take-up support, transmission mechanism through which the drive is transmitted to the feed mechanism, a take-up roll which can be placed on and rotated by said support, a device for locking the transmission mechanism and thus rendering it inoperative, said device being movable to disengage and release the transmission mechanism, and means associated with the roll and arranged to control said locking device whereby when the roll is placed on the take-up support in one position relatively thereto the locking device is moved and releases the transmission mechanism thereby rendering this mechanism operative but when the roll is placed on the take-up support in the other position relatively thereto the locking device engages the transmission mechanism and renders it inoperative and the drive cannot be transmitted to the feed mechanism.

4. In a motion picture camera or projector, in combination, film feed mechanism, a take-up spindle, means for driving the feed mechanism and take-up support; transmission mechanism through which the drive is transmitted to the feed mechanism, a device for locking the transmission mechanism and thus rendering it inoperative, said device being movable to disengage and release the transmission mechanism, a take-up spool comprising a hollow hub carrying two flanges, and an externally projecting rib on the outer face of one flange which rib, when the spool is placed on the spindle in one position relatively thereto engages the locking device and moves it out of engagement with the transmission mechanism but when the spool is placed on the spindle in the reversed position relatively thereto with the other flange adjacent to the locking device this flange does not engage the locking device and the transmission mechanism remains inoperative.

5. In a motion picture camera or projector, in combination, film feed mechanism, a take-up support, means for driving the feed mechanism and take-up support, transmission mechanism through which the drive is transmitted to the feed mechanism, a take-up roll which can be placed on and rotated by said support, a clutch device controlling the transmission of the drive through the transmission mechanism, and means associated with the roll and arranged to cooperate with said clutch device whereby when the roll is placed on the take-up support in one position relatively thereto the clutch is operative and the drive can be transmitted to the feed mechanism, but when the roll is placed on the take-up support in the other position relatively thereto the clutch is inoperative and the drive cannot be transmitted to the feed mechanism.

6. In a motion picture camera or projector, in combination, film feed mechanism, a take-up spindle, means for driving the feed mechanism and take-up spindle, transmission mechanism through which the drive is transmitted to the feed mechanism, a clutch adapted to operatively engage the transmission and consisting of a movable member arranged within a recess in the spindle with a part of this member which in one position will project through an opening in the spindle, and a take-up roll which when placed on said spindle will be rotated by it, the roll having an annular internal recess at one end thereof which recess when the roll is placed in one positoin on the spindle will accommodate the part of the said movable member when it projects from the spindle the clutch thus remaining inoperative, but when the roll is placed on the spindle in the other position relatively thereto the roll engages the projecting part of said movable member and causes the clutch to engage thereby rendering the transmission mechanism operative.

7. In a motion picture camera or projector, in combination, film feed mechanism, a take-up support, a supply support, means for driving the feed mechanism and take-up support, transmission mechanism through which the drive is transmitted to the feed mechanism, a take-up roll which can be placed on the supports and driven by the take-up support when placed thereon, means associated with the roll whereby when this is placed on the take-up support in one position relatively thereto the transmission mechanism is operative but when the roll is placed on the take-up support in the other position relatively thereto the transmission mechanism is inoperative, and means whereby the roll can only be placed on the supply support with the axis of the roll reversed end for end relatively to that position of the roll on the take-up support when the transmission mechanism is operative.

8. In a motion picture camera or projector, in combination, supply and take-up spindles, each having a longitudinal slot opening at the free end of the spindle with the slot in the take-up spindle longer than that in the supply spindle, a feed mechanism, means for driving the feed mechanism and take-up support, transmission mechanism through which the drive is transmitted to the feed mechanism, a take-up roll which can be placed on the spindles and rotated by the take-up spindle when placed thereon, means associated with the take-up roll and which, when the roll is placed on the take-up spindle in one position relatively thereto causes the transmission mechanism to be operative but when placed on the take-up spindle in the other position relatively thereto causes the transmission mechanism to be inoperative, and an internal projection carried by the roll adjacent to one end thereof which lies remote from the free end of the take-up spindle when the roll is in the position thereon in which the transmission mechanism is operative, said projection being adapted to slide freely within the slots in the spindles.

9. In a motion picture camera or projector, in combination, film feed mechanism, take-up and supply spindles each having a longitudinal slot opening at the free end of the spindle with the slot in the take-up spindle longer than that in the supply spindle, means for driving the feed mechanism and take-up spindle, transmission mechanism through which the drive is transmitted to the feed mechanism, a take-up roll which can be placed on either spindle and rotated by the take-up spindle when placed thereon, a device for locking the transmission mechanism and movable to disengage and release this mechanism, means associated with the roll and arranged to cooperate with the locking device whereby when the roll is placed on the take-up spindle in one position relatively thereto the locking device is moved and releases the transmission mechanism but when the roll is placed on the take-up spindle in the other position relatively thereto the locking device engages the transmission mechanism and renders this inoperative, and an internal projection carried by the roll adjacent to that end thereof which lies remote from the free end of the take-up spindle when the roll is arranged thereon to render the transmission mechanism operative, said internal projection being constructed to engage and slide freely along the slots in the spindles.

10. In a motion picture camera or projector in combination, film feed mechanism, take-up and supply spindles each having a longitudinal slot opening at the free end of the spindle with the slot in the take-up spindle longer than that in the supply spindle, means for driving the feed mechanism and take-up spindle, transmission mechanism through which the drive is transmitted to the feed mechanism, a device for locking the transmission mechanism and thus rendering it inoperative, said device being movable to disengage and release the transmission mechanism, a take-up spool comprising a hollow hub carrying two flanges and an externally projecting rib on the outer face of one flange which rib, when the spool is placed on the take-up spindle in one position relatively thereto engages the locking device and moves it out of engagement with the transmission mechanism but when the spool is placed on the take-up spindle in the reversed position relatively thereto the locking device is not moved and the transmission mechanism remains inoperative, and an internal projection carried by the spool adjacent to that end thereof which lies remote from the free end of the take-up spindle when the spool is arranged thereon to render the transmission mechanism operative, said internal projection being constructed to engage and slide freely along the slots in the spindles.

11. In a motion picture camera or projector in combination, film feed mechanism, take-up and supply spindles each having a longitudinal slot opening at the free end of the spindle with the slot in the take-up spindle longer than that in the supply spindle, means for driving the feed mechanism and take-up spindle, transmission mechanism through which the drive is transmitted to the feed mechanism, a clutch device controlling the transmission of the drive through the transmission mechanism, a take-up spool which can be placed on either spindle and rotated by the take-up spindle when placed thereon, means associated with the spool and arranged to cooperate with said clutch device whereby when the spool is placed on the take-up spindle in one position relatively thereto, the clutch is operative but when the spool is placed on the take-up spindle in the other position relatively thereto the clutch is inoperative, and an internal projection carried by the spool adjacent to that end thereof which lies remote from the free end of the take-up spindle when the spool is arranged thereon to render the transmission mechanism operative, said internal projection being constructed to engage and slide freely along the slots in the spindles.

12. In a motion picture camera or projector, in combination, film feed mechanism, take-up and supply spindles each having a longitudinal slot opening at the free end of the spindle with the slot in the take-up spindle longer than that in the supply spindle, means for driving the feed mechanism and take-up spindle, transmission mechanism through which the drive is transmitted to the feed mechanism, a movable clutch member adapted to move to and from an operative position engaging the transmission mechanism and arranged within a recess in the take-up spindle, means tending to maintain the clutch member with a part thereof projecting through an opening in this spindle, a take-up roll which can be placed on either spindle and rotated by the take-up spindle when placed thereon, the roll having an internal annular recess at one end thereof which recess will accommodate the part of the clutch member projecting from the spindle when the roll is placed in one position thereon, the clutch thus remaining inoperative, but when the roll is placed on the take-up spindle in the other position relatively thereto the roll engages said projecting part of the clutch member thus rendering the clutch and transmission mechanism operative, and an internal projection carried by the roll adjacent to that end remote from the internal annular recess, said internal projection being constructed and arranged to slide freely in the slots.

13. In a motion picture camera, in combination, film feed mechanisms, supply and take-up spindles, means for driving the feed mechanism and take-up spindle, transmission mechanism through which the drive is transmitted to the feed mechanism, a reversible magazine comprising a casing containing a rotatable take-up core, said casing having apertures in opposite side walls through which both spindles can be inserted from the two sides of the magazine, and means associated with each core whereby when the magazine is placed on the spindles in either of two relatively inverted and reversed positions the transmission mechanism is operative but when the magazine is placed on the spindles in any other position relatively thereto the transmission mechanism is inoperative and the drive cannot be transmitted to the feed mechanism.

14. In a motion picture camera, in combination, film feed mechanism, take-up and supply spindles, means for driving the feed mechanism and take-up spindle, transmission mechanism through which the drive is transmitted to the feed mechanism, a reversible magazine comprising a casing containing a rotatable supply core and a rotatable take-up core, said magazine having openings in opposite side walls through which the spindles can be passed from either side of the magazine, a device for locking the transmission mechanism and thus rendering it inoperative, said device being movable to disengage and release the transmission mechanism, and means carried by the magazine and arranged to control said locking device whereby when the magazine is placed on the spindles in either of two relatively reversed and inverted positions the locking device is moved and releases the transmission mechanism but when the magazine is placed on the spindle in any other position the locking device engages the transmission mechanism and renders it inoperative and the drive cannot be transmitted to the feed mechanism.

15. In a motion picture camera, in combination, film feed mechanism, take-up and supply spindles, means for driving the feed mechanism and take-up spindle, transmission mechanism through which the drive is transmitted to the feed mechanism, a device for locking the transmission mechanism and thus rendering it inoperative, said device being movable to disengage and release the transmission mechanism, a reversible magazine comprising a casing containing a rotatable supply core and a rotatable take-up core, and external projections on the outer faces of the opposite side walls of the magazine whereby when the magazine is placed on the spindles in either of two relatively reversed and inverted positions one of the external projections engages and moves the locking device out of engagement with the transmission mechanism but when the magazine is placed on the spindles in any other position the locking device is not moved and the transmission mechanism remains inoperative.

16. In a motion picture camera or projector, in combination, film feed mechanism, a take-up support, means for driving the feed mechanism and take-up support, transmission mechanism through which the drive is transmitted to the feed mechanism, a take-up roll which can be placed on said support, a friction coupling through which the drive can be transmitted to the take-up roll, and means associated with the roll whereby when this is placed on the take-up support in one position relatively thereto the transmission mechanism is operative but when the roll is placed on the support in the reversed position relatively thereto the transmission mechanism is inoperative and the drive cannot be transmitted to the feed mechanism.

17. In a motion picture camera or projector, in combination, film feed mechanism, a take-up support, means for driving the feed mechanism and take-up support, transmission mechanism through which the drive is transmitted to the feed mechanism, a take-up roll which can be placed on said support, a friction coupling through which the drive is transmitted to the take-up roll, a device for locking the transmission mechanism and thus rendering it inoperative, said device being movable to disengage and release the transmission mechanism, and means associated with the roll and arranged to control said locking device whereby when the roll is placed on the take-up support in one position relatively thereto the locking device is moved and releases the transmission mechanism thereby rendering this mechanism operative but when the roll is placed on the take-up support in the other position relatively thereto the locking device engages the transmission mechanism and renders it inoperative and the drive cannot be transmitted to the feed mechanism.

18. In a motion picture camera or projector, in combination, film feed mechanism, a take-up support, means for driving the feed mechanism and take-up support, transmission mechanism through which the drive is transmitted to the feed mechanism, a take-up roll which can be placed on said support, a friction coupling through which the drive is transmitted to the take-up roll, a clutch device controlling the transmission of the drive through the transmission mechanism, and means associated with the roll and arranged to cooperate with said clutch device whereby when the roll is placed on the take-up support in one position relatively thereto the clutch is operative and the drive can be transmitted to the feed mechanism, but when the roll is placed on the take-up support in the other position relatively thereto the clutch is inoperative and the drive cannot be transmitted to the feed mechanism.

LESLIE ERNEST THOMAS BRANCH.